(12) United States Patent
Dagdeviren

(10) Patent No.: US 6,496,124 B1
(45) Date of Patent: Dec. 17, 2002

(54) SYSTEM AND METHOD FOR COMPENSATING FOR CODEC DC OFFSET THROUGH A DC BLOCKING CHANNEL AND MODEM INCORPORATING THE SAME

(75) Inventor: Nuri R. Dagdeviren, Holmdel, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/695,671

(22) Filed: Oct. 24, 2000

Related U.S. Application Data

(60) Provisional application No. 60/169,961, filed on Dec. 9, 1999.

(51) Int. Cl.[7] .............................................. H03M 1/10
(52) U.S. Cl. ...................................... 341/118; 341/120
(58) Field of Search ................................ 341/118, 120, 341/144, 155

(56) References Cited

U.S. PATENT DOCUMENTS

| | | | |
|---|---|---|---|
| 5,999,109 A | * | 12/1999 | Norrell et al. ................. 341/58 |
| 6,278,744 B1 | * | 8/2001 | Olafsson et al. ............ 375/296 |
| 6,289,070 B1 | * | 9/2001 | Krone et al. ................. 375/377 |

* cited by examiner

*Primary Examiner*—Howard L. Williams

(57) ABSTRACT

A system for, and method of, compensating for codec DC offset and a modem incorporating the system or the method. In one embodiment, the system includes: (1) a DC offset compensator that develops and transmits a DC offset indicator signal corresponding to a DC offset present along a transmission path to a receiving codec and (2) a DC offset encoder, coupled to the DC offset compensator, that receives the DC offset indicator signal and applies a time-varying DC offset compensating signal based thereon to a user data symbol stream transmitted along the transmission path.

21 Claims, 2 Drawing Sheets

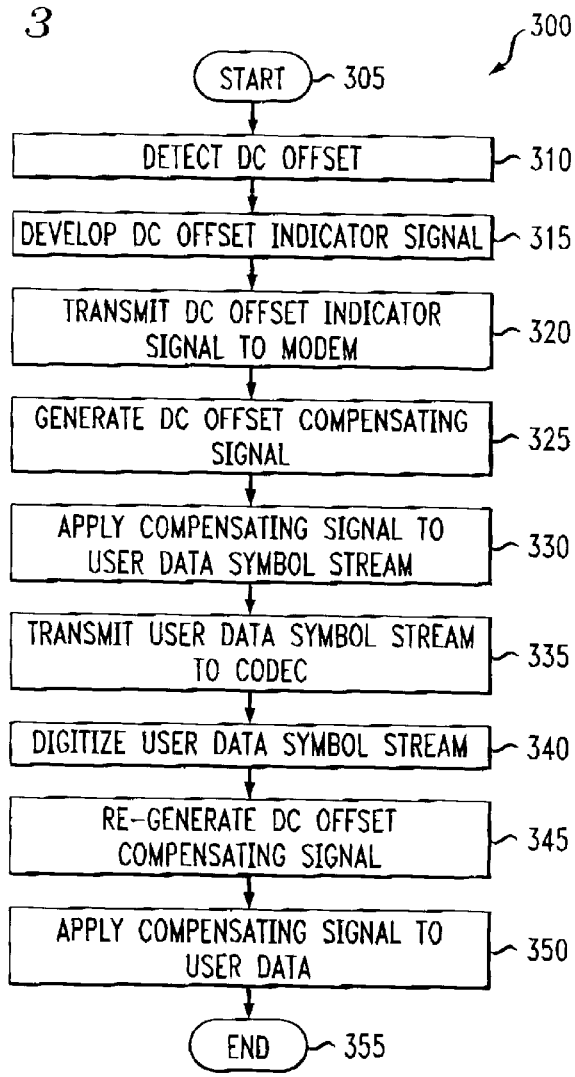
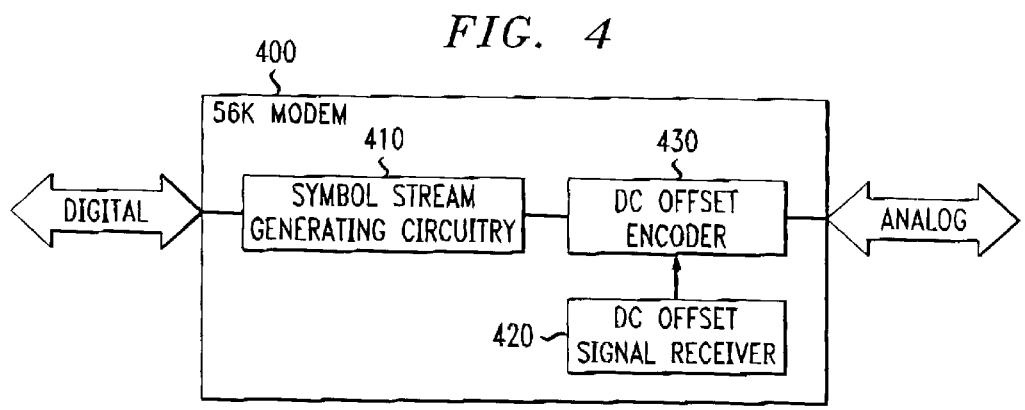

SYSTEM AND METHOD FOR COMPENSATING FOR CODEC DC OFFSET THROUGH A DC BLOCKING CHANNEL AND MODEM INCORPORATING THE SAME

CROSS-REFERENCE TO RELATED APPLICATION

This application is based on U.S. Provisional Application Serial No. 60/169,961, filed Dec. 9, 1999, entitled "Compensating Codec DC Offset Through a DC Blocking Channel," commonly assigned herewith and incorporated herein by reference.

TECHNICAL FIELD OF THE INVENTION

The present invention is directed, in general, to coder/decoders (codecs) and, more specifically, to a system and method for compensating for codec DC offset through a DC blocking channel and a modem incorporating the same.

BACKGROUND OF THE INVENTION

"56K" modems are currently the most popular means by which users can gain access to the Internet. 56K modems offer users asymmetric connection speeds. For data downloaded from the Internet to the user's modem, a connection speed of over 50 thousand bits per second (kbps) is possible. For data uploaded from the user's modem to the Internet, a maximum connection speed of 28.8 kbps is conventionally possible. The asymmetry is appropriate, because interacting with the Internet almost always results in more data being downloaded than uploaded.

While realizing a higher downloading speed has proven to be challenging, achieving a higher uploading speed is proving to be even more so. One significant problem standing in the way of increasing uploading speed is encountered at a codec employed on the receiving (Internet) end. A codec is employed at the receiving end to digitize the user data symbol stream generated by the modem. Unfortunately, codecs are subject to DC offset at their analog input when the user data symbol stream averages out to a nonzero voltage over time (which is almost always the case). Though codecs are provided with zero balancing circuits, DC offset often changes over time. Zero balancing circuits have proven to be unable reliably to compensate for time-varying DC offsets.

Compensating for DC offset is relatively straightforward if the codec in question is produces a linear digital output; the codec's digital output can be incremented or decremented by a number corresponding to the DC offset. However, codecs often nonlinearly compress their digital output according to well-known A-law or $\mu$-law compression techniques. DC offset does not evidence itself linearly in the output of these codecs, which renders linear DC offset compensation inadequate. Nonlinear digital compensation, while possible, is complex and difficult to implement.

It would, of course, be desirable simply to bias the user data symbol stream with a DC component to compensate for DC offset at the receiving codec. However, in the case of 56k modems, the transmission path, or channel, connecting the modem to the codec contains a DC blocking device. The DC blocking device, which usually takes the form of a transformer would serve to block any DC component before it could reach the codec and compensate for DC offset.

Accordingly, what is needed in the art is a way to compensate for codec DC offset that is compatible with DC blocking channels.

SUMMARY OF THE INVENTION

To address the above-discussed deficiencies of the prior art, the present invention provides a system for, and method of, compensating for codec DC offset and a modem incorporating the system or the method. In one embodiment, the system includes: (1) a DC offset compensator that develops and transmits a DC offset indicator signal corresponding to a DC offset present along a transmission path to a receiving codec and (2) a DC offset encoder, coupled to the DC offset compensator, that receives the DC offset indicator signal and applies a time-varying DC offset compensating signal based thereon to a user data symbol stream transmitted along the transmission path. The DC offset compensator can employ the DC offset compensating signal to remove at least a portion of the DC offset compensating signal to yield the user data symbol stream.

The present invention therefore introduces the broad concept of encoding compensation for codec DC offset in a deterministic, time-varying signal that is transmitted along with a user data symbol stream. Thus, the DC offset is, in effect, encoded into AC form.

The time-varying signal can traverse any DC blocking circuitry, such as a transformer, and thereby reach the receiving codec. Because the time-varying signal is deterministic, circuitry proximate the receiving codec can compute and remove the time-varying signal, leaving the user data symbol stream for digitization.

In one embodiment of the present invention, the DC offset compensating signal comprises a deterministic pseudo-random number sequence. Those skilled in the pertinent art are familiar with pseudo-random numbers and techniques for generating them. The present invention can make use of such techniques to generate the same pseudo-random number sequence at both the transmitting and receiving ends of a communications channel. The pseudo-random number sequence is first added to, and then subtracted from, a user data symbol stream to compensate for DC offset that may occur due to patterns in the user data symbol stream.

In one embodiment of the present invention, the DC offset compensating signal has a component that tends to average about an oppositely signed negative of the DC offset. In an embodiment to be illustrated and described, if the DC offset is represented by C, the component of the DC offset compensating signal tends to average about $-C$.

In one embodiment of the present invention, the DC offset compensator removes an entirety of the DC offset compensating signal. This maximizes compensation for DC offset. However, in some embodiments of the present invention, some portion of the DC offset compensating signal may, or may be allowed to, remain. In the broad scope of the present invention, at least some DC offset compensation occurs.

In one embodiment of the present invention, the DC offset compensator removes at least the portion of the DC offset compensating signal by recalculating the pseudo-random number sequence. Recalculation allows the pseudo-random number sequence to be at least partially removed from any user data symbol stream.

In one embodiment of the present invention, the DC offset compensating signal is capable of passing substantially undistorted through a DC blocking transformer. In an alternative embodiment of the present invention, the DC offset indicator signal may be somewhat distorted (or attenuated), but DC offset compensation still at least partially takes place by virtue of its presence.

In one embodiment of the present invention, the DC offset encoder is associated with a 56K modem. Those skilled in the pertinent art will appreciate that compensation for any DC offset that may occur at the receiving codec allows for higher upstream communication rates with such modems. Those skilled in the pertinent art will also understand that the principles of the present invention may be broadly applied in a variety of circumstances in which a DC signal is required to be encoded into AC form for the purpose of traversing a DC blocking circuit.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3 illustrates a method of compensating for codec DC offset carried out according to the principles of the present invention; and FIG. 4 illustrates a block diagram of a 56k modem that incorporates the system of FIG. 2 or the method of FIG. 3.

DETAILED DESCRIPTION

Figure 1:
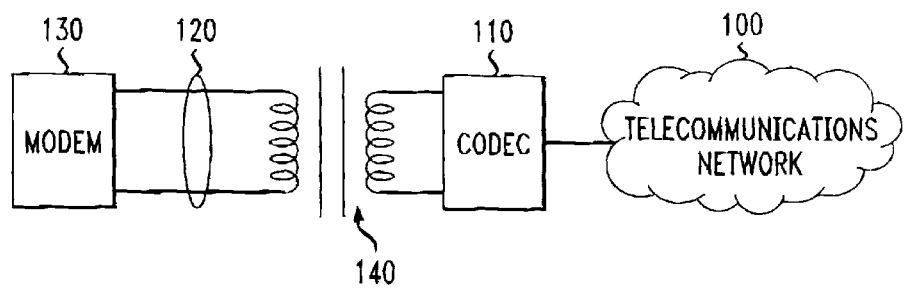
FIG. 1 illustrates a block diagram of a portion of a telecommunications network illustrating the problem addressed by the present invention.

Referring initially to FIG. 1, illustrated is a block diagram of a portion of a telecommunications network, generally designated 100, that illustrates the problem addressed by the present invention.

The network 100 includes a pulse-code modulating (PCM) codec 110 that provides analog-to-digital conversion between a local loop 120 and the network 100. A 56k modem 130 is coupled to the local loop 120 distal from the codec 110. A DC blocking transformer 140 is coupled to the local loop 120 between the codec 110 and the modem 130. The DC blocking transformer 140 transforms the local loop 120 into a DC blocking channel.

As those having skill in the pertinent art are familiar, the upload speed of the modem 130 is limited by, among other things, DC offset occurring at the analog input of the codec 110. The present invention is directed to attenuating the DC offset, taking into account that the DC blocking transformer 140 blocks any DC signal that could be conventionally employed to compensate for DC offset at the analog input of the codec 110.

Figure 2:
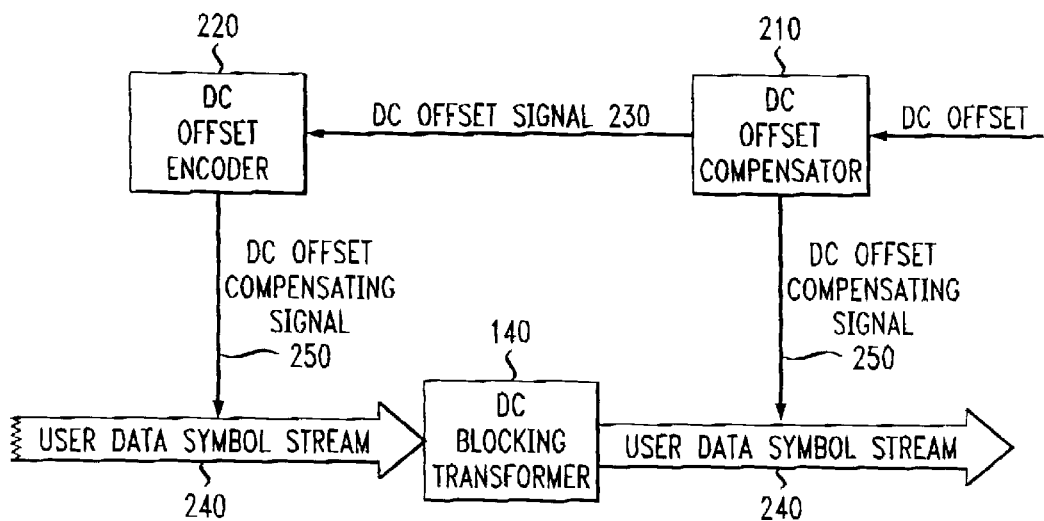
FIG. 2 illustrates a block diagram of a system for compensating for codec DC offset constructed according to the principles of the present invention.

Turning now to FIG. 2, illustrated is a block diagram of a system for compensating for codec DC offset constructed according to the principles of the present invention. The system comprises a DC offset compensator 210 (associated, in the illustrated embodiment, with a receiving codec, such as the codec 110 of FIG. 1) and a DC offset encoder 220 (associated, in the illustrated embodiment, with a transmitting modem, such as the modem 130 of FIG. 1). The DC offset compensator 210 detects the magnitude of DC offset occurring at the analog input of the receiving codec. The DC offset compensator 210 then transmits a corresponding DC offset indicator signal 230 to the DC offset encoder 220, perhaps via a downloaded symbol stream.

In response, the DC offset encoder 220 generates a time varying DC offset compensating signal 250 based on the DC offset indicator signal. It is important that the DC offset compensating signal 250 be time-varying, since the DC offset compensating signal 250 must later at least partially traverse a DC blocking transformer.

In one exemplary embodiment, the DC offset compensating signal 250 has two components, a DC component and an AC component. The DC component is equal in magnitude and opposite in sign to the DC offset. For example, if the DC offset at a given point in time has a magnitude c, the DC component of the DC offset compensating signal has a corresponding magnitude −c.

The AC component $t_k$ of the DC offset compensating signal 250 is a deterministic pseudo-random number sequence dynamically generated to average out to c. In the exemplary embodiment, $t_k$ is a function of the PCM symbols $x_k$ comprising the user data symbol stream transmitted at time k, the running digital sum (RDS) $\Sigma_k$ of the user data symbol stream and is generated according to the following rule:

if $\Sigma_k/c \geq 0$ then $t_{k+1}=0$ else $tk=Y_k-x_k$, where $y_k$ is a PCM encoder level uniquely specified by the conditions:

$|t_k|>|c|$, $|t_k|$ is as small as possible, and $|t_k/c>0$.

Here, the RDS $\Sigma_k$ is defined as being equal to $\Sigma S_k$.

Once the time-varying DC offset compensating signal 250 is generated, the DC offset encoder 220 causes the signal 250 to be applied (added) to a user data symbol stream 240. The user data symbol stream 240 is then transmitted from the modem along the local loop to the receiving codec.

Along the way, the user data symbol stream 240 encounters the DC blocking transformer 140 (represented in FIG. 2 as a block rather than as a schematic symbol as it was in FIG. 1). Assuming that the DC offset compensating signal comprises a DC component, the DC blocking transformer 140 at least substantially removes the DC component, and allows the AC component and the user data symbol stream 240 to pass. Because the user data symbol stream 240 (including the remaining AC component of the DC offset compensating signal 250) averages out to 0 volts, DC bias has been reduced, and perhaps substantially eliminated, when the user data symbol stream reaches the input of the codec.

The codec then converts the user data symbol stream to digital form. At this point, it is necessary to remove the converted AC component of the DC offset compensating signal from the user data. This is done by recalculating the AC component and subtracting it from the user data. Since, in the exemplary embodiment, the AC component is a deterministic pseudo-random number sequence, the DC offset compensator 210 can accurately recalculate the AC component. Once recalculated, the AC component can be subtracted from the user data, restoring the user data to useful form.

Turning now to FIG. 3, illustrated is a method of compensating for codec DC offset carried out according to the principles of the present invention.

The method, generally designated 300, begins in a start step 305, wherein it is desired to upload user data from a modem (perhaps to another modem, not shown) through a codec that is part of a telecommunications network. The method 300 continues in a step 310, wherein DC offset is detected at the input of the receiving codec. It being desirable at least to reduce this DC offset, a DC offset indicator signal is developed in a step 315 and transmitted to circuitry associated with the modem in a step 320.

In a step 325, a time-varying DC offset compensating signal is generated based on the DC offset indicator signal (perhaps in the manner set forth above, but perhaps in any other appropriate manner). The DC offset compensating signal is then applied to a user data symbol stream to be transmitted from the modem to the codec in a step 330.

Next, in a step 335, the user data symbol stream (including the DC offset compensating signal) is transmitted to the input of the codec. Along the way, the user data symbol stream encounters, and traverses, a DC blocking transformer. The user data symbol stream arrives at the codec and, because its average voltage is at or near zero, DC offset at the codec input has at least been reduced. The codec then digitizes the user data symbol stream to yield digitized user data in a step 340.

It being now necessary to remove the DC offset compensating signal from the user data, circuitry associated with the codec recalculates the DC offset compensating signal in a step 345 and subtracts the DC offset compensating signal from the user data in a step 350. This yields user data in useful form for continued transmission to the telecommunications network. The method 300 then ends in an end step 355, at which point the user data are forwarded through the telecommunications network.

Turning now to FIG. 4, illustrated is a block diagram of a 56k modem that incorporates the system of FIG. 2 or the method of FIG. 3. The 56k modem, generally designated 400, comprises symbol stream generating circuitry 410. Those skilled in the art are familiar with the structure and function of symbol stream generating circuitry. The 56k modem 400 of the present invention advantageously employs such circuitry 410 for generating a user data symbol stream for uploading user data to a receiving codec (not shown in FIG. 4).

The 56k modem 400 further comprises a DC offset indicator signal receiver 420 responsible for receiving a DC offset indicator signal from circuitry associated with the receiving codec. The DC offset indicator indicates DC offset that exists along the transmission path joining the 56k modem 400 and the receiving codec.

The 56k modem 400 further comprises a DC offset encoder 430 responsible for receiving the DC offset indicator signal from the DC offset indicator signal receiver 420 and developing therefrom a time-varying DC offset compensating signal that can be applied to the user data symbol stream produced by the symbol stream generating circuitry 410 to achieve DC offset compensation at the receiving codec in spite of any DC blocking circuitry present in the local loop that couples the modem 400 and the receiving codec.

Although the present invention has been described in detail, those skilled in the art should understand that they can make various changes, substitutions and alterations herein without departing from the spirit and scope of the invention in its broadest form.

What is claimed is:

1. A system for compensating for codec DC offset, comprising:

a DC offset compensator that develops and transmits a DC offset indicator signal corresponding to a DC offset present along a transmission path to a receiving codec; and a DC offset encoder, coupled to said DC offset compensator, that receives said DC offset indicator signal and applies a time-varying DC offset compensating signal based thereon to a user data symbol stream transmitted along said transmission path.

2. The system as recited in claim 1 wherein said DC offset compensating signal comprises a deterministic pseudo-random number sequence.

3. The system as recited in claim 1 wherein said DC offset compensating signal has a component that tends to average about an oppositely signed negative of said DC offset.

4. The system as recited in claim 1 wherein said DC offset compensator removes an entirety of said DC offset.

5. The system as recited in claim 1 wherein said DC offset compensator recalculates said DC offset compensating signal.

6. The system as recited in claim 1 wherein said DC offset compensating signal is capable of passing substantially undistorted through a DC blocking transformer.

7. The system as recited in claim 1 wherein said DC offset encoder is associated with a 56K modem.

8. A method of compensating for codec DC offset, comprising:

developing a DC offset indicator signal corresponding to a DC offset present along a transmission path to a receiving codec;

applying a time-varying DC offset compensating signal, based on said DC offset indicator signal, to a user data symbol stream transmitted along said transmission path; and removing at least a portion of said DC offset compensating signal to substantially yield said symbol stream.

9. The method as recited in claim 8 wherein said removing is performed proximate said receiving codec.

10. The method as recited in claim 8 wherein said DC offset compensating signal comprises a deterministic pseudo-random number sequence.

11. The method as recited in claim 8 wherein said DC offset compensating signal has a component that tends to average about an oppositely signed negative of said DC offset.

12. The method as recited in claim 8 wherein said removing comprises removing an entirety of said DC offset compensating signal.

13. The method as recited in claim 8 wherein said removing comprises recalculating said DC offset compensating signal.

14. The method as recited in claim 8 wherein said DC offset compensating signal is capable of passing substantially undistorted through a DC blocking transformer.

15. The method as recited in claim 8 wherein said DC offset encoder is associated with a 56K modem.

16. A modem, comprising:

a DC offset indicator signal receiver that receives a DC offset indicator signal corresponding to a DC offset present along a transmission path to a receiving codec coupled to said modem;

symbol stream generating circuitry that generates a user data symbol stream containing user data; and a DC offset encoder, coupled to said DC offset compensator, that applies a time-varying DC offset compensating signal based thereon to a user data symbol stream transmitted along said transmission path.

17. The modem as recited in claim 16 wherein said DC offset compensating signal comprises a deterministic pseudo-random number sequence.

18. The modem as recited in claim 16 wherein said DC offset compensating signal has a component that tends to average about an oppositely signed negative of said DC offset.

19. The modem as recited in claim 16 wherein said DC offset compensating signal is capable of passing substantially undistorted through a DC blocking transformer.

20. The modem as recited in claim 16 wherein said DC offset indicator signal changes throughout a given modem session.

21. The modem as recited in claim 16 wherein said modem is a 56K modem.

* * * * *